United States Patent
Chen et al.

(10) Patent No.: US 12,357,966 B2
(45) Date of Patent: Jul. 15, 2025

(54) SUPERABSORBENT POLYMER AND METHOD OF PRODUCING THE SAME

(71) Applicant: FORMOSA PLASTICS CORPORATION, Kaohsiung (TW)

(72) Inventors: Zhong-Yi Chen, Kaohsiung (TW); Yu-Sam Lin, Kaohsiung (TW); Ya-Chi Lin, Kaohsiung (TW); Ping-Chung Cheng, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 846 days.

(21) Appl. No.: 17/529,850

(22) Filed: Nov. 18, 2021

(65) Prior Publication Data
US 2023/0049825 A1 Feb. 16, 2023

(30) Foreign Application Priority Data
Aug. 3, 2021 (TW) ................. 110128613

(51) Int. Cl.
*B01J 20/26* (2006.01)
*B01J 20/04* (2006.01)
*B01J 20/28* (2006.01)
*B01J 20/30* (2006.01)

(52) U.S. Cl.
CPC .......... *B01J 20/267* (2013.01); *B01J 20/041* (2013.01); *B01J 20/28004* (2013.01); *B01J 20/28026* (2013.01); *B01J 20/28047* (2013.01); *B01J 20/28066* (2013.01); *B01J 20/3021* (2013.01); *B01J 20/3085* (2013.01)

(58) Field of Classification Search
None
See application file for complete search history.

(56) References Cited

U.S. PATENT DOCUMENTS

| | | | |
|---|---|---|---|
| 5,562,646 A | 10/1996 | Goldman |
| 6,346,569 B1 | 2/2002 | Irizato |
| 6,849,665 B2 | 2/2005 | Frenz |
| 7,163,966 B2 | 1/2007 | Joy |
| 7,173,086 B2 | 2/2007 | Smith |
| 7,812,082 B2 | 10/2010 | Mcintosh |
| 9,285,302 B2 | 3/2016 | Ehrnsperger |
| 10,028,867 B2 | 7/2018 | Ehrnsperger |
| 2004/0106745 A1 | 6/2004 | Nakashima |

(Continued)

FOREIGN PATENT DOCUMENTS

| | | |
|---|---|---|
| CN | 1747751 A | 3/2006 |
| CN | 1970594 A | 5/2007 |

(Continued)

OTHER PUBLICATIONS

CN 112552925 A (Year: 2021).*

*Primary Examiner* — Joseph D Anthony
(74) *Attorney, Agent, or Firm* — MUNCY, GEISSLER, OLDS & LOWE, P.C.

(57) ABSTRACT

A superabsorbent polymers and a method of forming the same are provided. The method is processed by adding calcined shell powders to a free radical polymerization. The superabsorbent polymers with more micropores can be obtained. Therefore, absorptivity and permeability for the liquid of the superabsorbent polymers are increased, and diffusibility and liquid conductivity of the superabsorbent polymers are also improved.

12 Claims, 2 Drawing Sheets

(56) References Cited

U.S. PATENT DOCUMENTS

| | | | |
|---|---|---|---|
| 2014/0042364 A1* | 2/2014 | Nogi | B01J 20/28085 |
| | | | 525/329.7 |
| 2016/0144341 A1 | 5/2016 | Hamilton | |
| 2017/0050170 A1 | 2/2017 | Braun | |
| 2019/0119452 A1* | 4/2019 | Yoon | C08F 20/06 |
| 2022/0354072 A1* | 11/2022 | Baba | C08F 218/06 |
| 2025/0010267 A1* | 1/2025 | Chen | B01J 20/267 |

FOREIGN PATENT DOCUMENTS

| | | |
|---|---|---|
| CN | 101168578 A | 4/2008 |
| CN | 108164740 A | 6/2018 |
| CN | 108659248 A | 10/2018 |
| CN | 110078940 A | 8/2019 |
| JP | 56131608 A | 10/1981 |
| JP | 57044627 A | 3/1982 |
| JP | 58042602 A | 3/1983 |
| JP | 58117222 A | 7/1983 |
| JP | 60163956 A | 8/1985 |
| JP | 60255814 A | 12/1985 |
| JP | 01113406 A | 5/1989 |
| JP | 01292004 A | 11/1989 |
| JP | 02153903 A | 6/1990 |
| JP | 201277157 A | 4/2012 |
| JP | 20211316 A | 1/2021 |
| KR | 102096664 B1 | 4/2020 |
| TW | 201900702 A | 1/2019 |
| WO | WO-0053644 A1 | 9/2000 |
| WO | WO-2004113452 A1 | 12/2004 |
| WO | WO-2005108472 A1 | 11/2005 |
| WO | WO-2008092843 A1 | 8/2008 |

\* cited by examiner

SUPERABSORBENT POLYMER AND METHOD OF PRODUCING THE SAME

CROSS-REFERENCE TO RELATED APPLICATION

This application claims priority to Taiwan Application Serial Number 110128613, filed Aug. 3, 2021, which is herein incorporated by reference.

BACKGROUND

Field of Invention

The present invention relates to a superabsorbent polymer and a method of producing the same. More particularly, the present invention relates to a superabsorbent polymer with excellent absorptivity and a method of producing the same.

Description of Related Art

Superabsorbent polymers is widely used, for example, as water retaining agent for agricultural or horticultural aspects, as an antidew condensation agent for construction materials, as a material used for removing water from petroleum, as waterproof cladding agent for outer layer of cable line, as personal sanitary products (e.g. diapers, feminine hygiene products, disposable wipes, and etc.), and among which, the diapers are the majority.

Absorptivity of the diapers depends on absorption rate, absorption capacity, and dryness. In recent years, it has been committed to reach thinness of the diapers, which decreases content of paper pulp (i.e. hydrophilic fiber) and increases content of superabsorbent polymers, thereby increasing a ratio of the superabsorbent polymers within absorbent structure of the diapers to achieve thinness of the diapers. However, the decrease of the content of hydrophilic fibers results in a decreasing of liquid storage space in short-term and a slowing of permeation rate of liquid, such that the liquid leaks without being absorbed immediately. Besides, in addition to having excellent absorption rate, the superabsorbent polymer should have high permeability. If the permeability for the liquid is poor, pores between particles will be blocked while the superabsorbent polymer absorbs liquid, thereby leading to colloid clogging situation and resulting in the leakage of the liquid from the absorber of the diapers, therefore decreasing the absorbability of the diapers.

Therefore, increasing the absorption rate and permeability of the superabsorbent polymers is one of the research focuses in the art currently. In the conventional method, polyvalent metal cation can be used to perform surface modification, or dihydroxyaluminum acetate can be used to increase saline flow conductivity. Permeability of the superabsorbent polymers can also be increased by using thermoplastic polymers, such as polyethylene or polypropylene, in a thermal treatment step or adding diazo compounds with amino groups as a foaming agent in an unsaturated monomer aqueous solution. In addition, in the unsaturated monomer aqueous solution, adding an encapsulated blowing agent or water-soluble alkoxysilane compounds subjects the produced superabsorbent polymers to have better absorption rate or great colloidal stability, respectively. Moreover, diffusibility and permeability for the liquid of the superabsorbent polymers which have absorbed the liquid can be general increased by mixing water-soluble polyvalent metal powders and adhesives with the superabsorbent polymers.

However, the absorption rate and the permeability for the liquid of the superabsorbent polymers are both evaluated after the superabsorbent polymer absorbs the liquids. Nevertheless, research results show that dry superabsorbent polymer particles are less prone to absorb the liquids once contacting with liquids compared to wet superabsorbent polymers because the diffusibility and conductivity of the liquids within the dry superabsorbent polymers are both less than those within the wet superabsorbent polymers. Therefore, side leakage of the diapers tends to occur while conventional superabsorbent polymers applied to the diapers.

Accordingly, it is needed to provide a superabsorbent polymer and a method of producing the same to make the dry superabsorbent polymer have superior liquid diffusibility and conductivity, and keep great absorption rate and permeability for the liquid simultaneously.

SUMMARY

An aspect of the present invention provides a method of producing a superabsorbent polymer, which adds calcined shell powders to involve in a free radical polymerization reaction. Then, the superabsorbent polymer with superior liquid diffusibility and conductivity is produced, and it also keeps great absorption rate and permeability for the liquid simultaneously.

An another aspect of the present invention provides a superabsorbent polymer, which is produced by the above aspect.

According to the aspect of the present invention, providing the method of producing the superabsorbent polymer. Initially, a free radical polymerization reaction is performed to a superabsorbent polymer composition and calcined shell powders to obtain a colloid gel. The superabsorbent polymer composition includes an unsaturated monomer aqueous solution, a polymerization initiator, and a free radical polymerization crosslinking agent. The calcined shell powders have a core-shell structure. The calcined shell powders have a particle size of 100 μm to 1 mm. Based on an amount of the unsaturated monomer aqueous solution as 100 wt %, an amount of the calcined shell powders is 0.005 wt % to 10 wt %. Then, the colloid gel is smashed and screened to obtain plural of superabsorbent polymer particles. Afterwards, a surface crosslinking reaction is performed to the superabsorbent polymer particles to obtain the superabsorbent polymer.

According to an embodiment of the present invention, a core of the core-shell structure is a micron particle of calcium carbonate, a shell layer of the core-shell structure is nanometer to sub-micron particles of calcium carbonate. An average particle size of the core is 7 μm to 500 μm, and an average particles size of the shell layer is not greater than 200 nm.

According to an embodiment of the present invention, whiteness of the calcined shell powders is at least 60.

According to an embodiment of the present invention, a specific surface area of the calcined shell powders is at least 8000 cm$^2$/g.

According to an embodiment of the present invention, the calcined shell powders are added before, during or after the free radical polymerization reaction is performed.

According to an embodiment of the present invention, pH value of the unsaturated monomer aqueous solution is 5.5 to 7.0.

According to an embodiment of the present invention, the polymerization initiator comprises a thermal decomposition initiator, a redox initiator or a combination thereof.

According to an embodiment of the present invention, based on an amount of the unsaturated monomer aqueous solution as 100 wt %, an amount of the polymerization initiator is 0.001 wt % to 10 wt %.

According to an embodiment of the present invention, based on an amount of the unsaturated monomer aqueous solution as 100 wt %, an amount of the free radical polymerization crosslinking agent is 0.001 wt % to 5 wt %.

According to an embodiment of the present invention, the method further comprises drying the colloid gel at a temperature of 100° C. to 250° C. before smashing and screening the colloid gel.

According to an embodiment of the present invention, an average particle size of the superabsorbent polymer particles is 0.06 mm to 1.00 mm.

According to an embodiment of the present invention, based on an amount of the superabsorbent polymer particles as 100 wt %, an amount of the surface crosslinking agent is 0.001 wt % to 10 wt %.

According to the another aspect of the present invention, the superabsorbent polymer, which is produced by the above method, is provided. A T20 value of the superabsorbent polymer is not greater than 180 seconds.

According to an embodiment of the present invention, a saline flow conductivity of the superabsorbent polymer is not less than $30 \times 10^{-7}$ cm$^3$-s/g.

According to an embodiment of the present invention, a free swell rate of the superabsorbent polymer is not less than 0.25 g/g/s.

With the application of the superabsorbent polymers and the method of producing the same of the present invention, adding specific amount of the calcined shell powders into the free radical polymerization reaction results in a generation of gas during the reaction, and the gas induces an increasing of micropores in the superabsorbent polymers. Therefore, the dry superabsorbent polymer can have superior liquid diffusibility and conductivity and keep great absorption rate and permeability for the liquid simultaneously.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

As used herein, "around," "about," "approximately," or "substantially" shall generally mean within 20 percent, or within 10 percent, or within 5 percent of a given value or range.

As described in the above, the present invention provides the superabsorbent polymer and the method of producing the same, and it results in a generation of gas during the reaction by adding specific amount of the calcined shell powders with specific particle size into the free radical polymerization reaction, such that the gas induces an increasing of micropores in the superabsorbent polymers. Therefore, the dry superabsorbent polymer can have superior liquid diffusibility and conductivity and keep great absorption rate and permeability for the liquid simultaneously.

Figure 1:
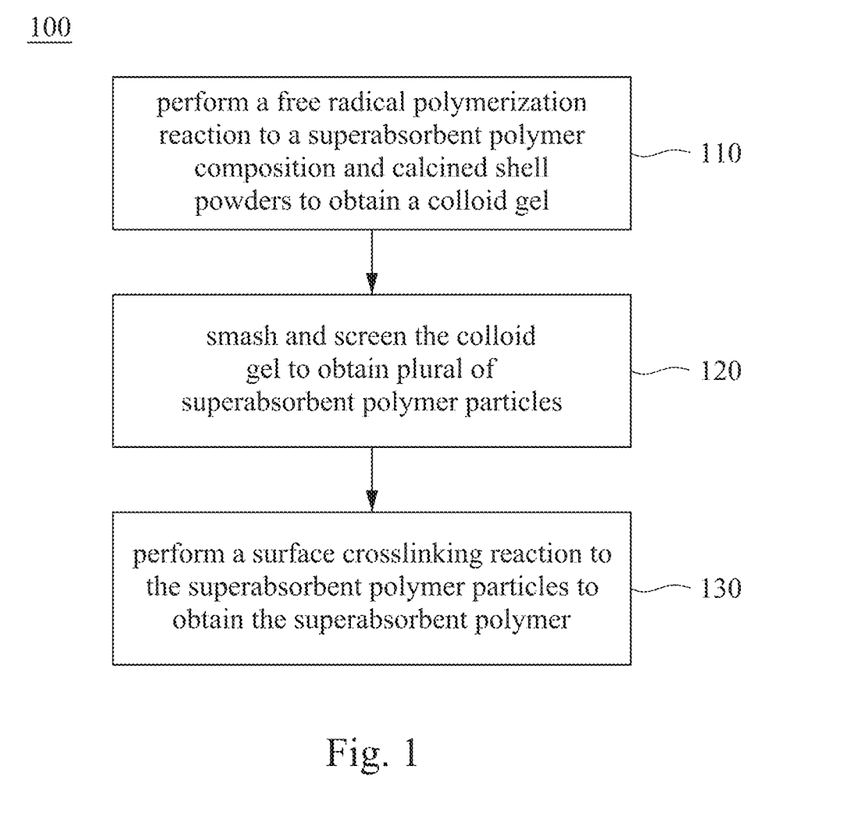
FIG. 1 illustrates a flow chart of a method of producing a superabsorbent polymer according to some embodiments of the present invention.

Referring to FIG. 1, which illustrates a flow chart of a method 100 of producing a superabsorbent polymer according to some embodiments of the present invention. First, operation 110 is performed to perform a free radical polymerization reaction to a superabsorbent polymer composition and calcined shell powders to obtain a colloid gel. In some embodiments, the superabsorbent polymer composition includes an unsaturated monomer aqueous solution, a polymerization initiator, and a free radical polymerization crosslinking agent. In some embodiments, the calcined shell powders are added before, during or after the free radical polymerization reaction is performed, in which the calcined shell powders is preferably added before the free radical polymerization reaction. If the calcined shell powders are added after the free radical polymerization is completed and the colloid gel is obtained, or the calcined shell powders are added during any other subsequent steps, it will not achieve the desired effect of the present invention. The reason is that the calcined shell powders with calcium carbonate as major component can be decomposed to produce carbon dioxide during the free radical polymerization reaction, and the carbon dioxide bubbles may distribute in the obtained colloid gel, thereby producing plenty of micropores in the colloid gel. Thus, the produced superabsorbent polymers can achieve the desired effect of the present invention.

In some embodiments, based on an amount of the unsaturated monomer aqueous solution as 100 wt %, an amount of the calcined shell powders is 0.005 wt % to 10 wt %, and preferably 0.005 wt % to 5 wt %. If the amount of the calcined shell powders is less than 0.005 wt %, the subsequent produced superabsorbent polymer will have a poor saline flow conductivity and permeability for the liquid. On the contrary, if the amount of calcined shell powders is greater than 10 wt %, it will not only increase manufacturing costs. Moreover, due to the major component of the calcined shell powders is inorganic salt without absorptivity property, calcined shell powders without involving in the reaction are remained in the subsequently produced superabsorbent polymers when the excessive calcined shell powders (e.g. greater than 10 wt %) are added. Thus, the absorption capacity of the superabsorbent polymers will decrease, and further the absorptivity of the superabsorbent polymers will decrease.

The above calcined shell powders are obtained by processing shellfish with single shell and/or shellfish with double shell, and major component of the calcined shell powders is calcium carbonate. In some examples, shellfish with single shell and/or shellfish with double shell are, for example but not limited to, oysters, clams, corbicula, abalones, green mussels, yesso scallops, haliotis, pearl shells, gold-lips, scallops, and any combination thereof. In this example, shellfish with single shell and/or shellfish with double shell generally contain calcium carbonate not less than 94 wt % and other inseparable components.

The above processing steps include performing a pretreatment step to the shellfish, which comprises removing leftover shell meat, and performing a surface cleaning step and a coarse breaking step to obtain the shell powders. In some examples, the surface cleaning step may be chemical mechanical cleaning. For example, the chemical mechanical cleaning may be performed by cleaning at room temperature with water or dilute acid solution (e.g. hydrochloric acid with concentration not greater than 4N or tartaric acid with concentration not less than 12%), chelating agent (e.g. EDTA or EDTMP with saturated concentration), or any combination thereof and mechanical force such as scrubbing, ultrasonic vibration and etc., or the chemical mechanical cleaning may be performed by pre-immersing the shellfish in the above solution for 2 hours to 24 hours and following with mechanical force. After the surface cleaning step, a commercial pulverizer is used to perform the coarse breaking step to the shellfish, and then shell granules with an average size not greater than 500 μm can be obtained. The above pretreatment step is known for the person with ordinary skill in the art of the present invention; hence the detailed description will not be repeated hereinafter.

In some embodiments, an alkaline coating step is selectively applied to the shell powders to obtain alkaline coated powders. In some embodiments, the shell powders are coated in the alkaline coating step for 2 hours to 4 hours by using calcium salt slurry, in which the calcium salt slurry contains at least 2.5 wt % calcium salt, for example 2.5 wt % to 20.0 wt % calcium salt, and weight to volume ratio (g/mL) of the shell powders and the calcium salt slurry is 0.1 to 1. In some embodiments, the calcium salt is calcium hydroxide.

Then, the above processing steps further include performing calcining step to the shell powders or the alkaline coated shell powder at 900° C. to 1200° C. to obtain the calcined shell powders. The calcining step may be performed for about 3 hours to about 6 hours. In some alternative embodiments, the calcining step may be performed for 4 hours to 5 hours at 1000° C. to 1100° C. It is noted that performing the calcining step at the above temperature range results in the calcined shell powders having effective content of calcium carbonate not less than 93 wt %.

In some embodiments, after the calcining step, a polishing step is selectively performed to the calcined shell powders in order to obtain the calcined shell powders with a particle size of 100 μm to 1 mm, 150 μm to 710 μm is preferable, and 250 μm to 500 μm is more preferable. If the particle size of the calcined shell powders is greater than 1 mm, the calcined shell powders are hard to mix with components of the superabsorbent polymer composition homogeneously, thereby tending not to involve the free radical polymerization reaction. On the contrary, if the particle size of the calcined shell powders is less than 100 μm, they may suspend within air in a plant, thereby harming respiratory tract of operators and resulting in health hazard.

In some embodiments, the produced calcined shell powders have a core-shell structure, in which a core of the core-shell structure is a micron particle of calcium carbonate, while a shell layer of the core-shell structure is nanometer to sub-micron particles of calcium carbonate. In some embodiments, the shell layer of the core-shell structure is a non-continuous layer or a continuous layer. In those embodiments, an average particle size of the calcium carbonate micron particle of the core is 7 μm to 500 μm, and an average particle size of the nanometer to sub-micron particles of calcium carbonate of the shell layer is not greater than 200 nm, and 60 nm to 150 nm is preferable. In some embodiments, whiteness of the calcined shell powder is at least 60, and 60 to 88 is preferable. In some embodiments, an amount of zinc is lower than 1.67 ppm, an amount of manganese is lower than 40 ppm and an amount of iron is lower than 350 ppm in the calcined shell powders. In some embodiments, a specific surface area of the calcined shell powders is at least 8000 cm$^2$/g.

In some embodiments, the unsaturated monomer aqueous solution of the superabsorbent polymer compositions includes monomers with acid group having unsaturated double bonds, such as acrylic acid. In some embodiments, the unsaturated monomer aqueous solution may be methacrylic acid, 2-acrylamido-2-methylpropanesulfonic acid, maleic acid (cis-butenedioic acid), maleic anhydride, fumaric acid (trans-butenedioic acid), and fumaric acid anhydride. The unsaturated monomer aqueous solution may include but not limit to one kind of monomer, but also select two or more aforementioned monomer aqueous solutions.

In some embodiments, a concentration of the unsaturated monomer aqueous solution may be, but not limit to, 20 wt % to 55 wt %, and 30 wt % to 45 wt % is preferable. Generally, if the concentration of the unsaturated monomer aqueous solution is 20 wt % to 55 wt %, viscosity of products after polymerization is suitable, so it's easier to perform machining, and heat of free radical polymerization reaction is more controllable.

In some alternative embodiments, other hydrophilic monomers with unsaturated double bonds may be selectively added, such as acrylamide, methacrylamide, 2-carboxyethyl acrylate, 2-carboxyethyl methacrylate, methyl acrylate, ethyl acrylate, dimethylamino acrylamide, and acrylamidopropyltrimonium chloride. However, an adding amount of the hydrophilic monomer is based on a principle of not destroying physical properties (such as centrifuge retention capacity and absorption rate) of the superabsorbent polymer.

In some embodiments, water-soluble polymers are also selectively added in the superabsorbent polymer composition to reduce processing cost. The water-soluble polymer may be partial saponified or fully saponified polyvinyl alcohol, polyethylene glycol, polyacrylic acid, polyacrylamide, starch or starch derivatives, such as methyl cellulose, acrylate methyl cellulose, ethyl cellulose, and etc., and preferably, the starch and partial saponified or fully saponified polyvinyl alcohols is used individually or are used after mixing. In these embodiments, there's no limit to molecular weight of the water-soluble polymers. Based on the amount of the unsaturated monomer aqueous solution as 100 wt %, an adding amount of the water-soluble polymer is according to principle of not lowering physical properties of the superabsorbent polymer, which usually is not greater than 20 wt %, not greater than 10 wt % is preferable, and not greater than 5 wt % is more preferable.

In some embodiments, the unsaturated monomer aqueous solution may be directly; or may be subjected to the polymerization reaction after the unsaturated monomer aqueous is partially neutralized with a neutralizing agent to become a neutral solution or a weak acidic solution. In these embodiments, the neutralizing agent includes hydroxides or carbonates of alkali metal or alkaline earth metal (e.g. sodium hydroxide, potassium hydroxide, sodium carbonate, potassium carbonate, sodium bicarbonate and potassium bicarbonate), amino compounds and a combination thereof. In some embodiments, a neutralizing concentration of the unsaturated monomer aqueous solution is 45 mol % to 85 mol %. If the neutralizing concentration is within the aforementioned range, the unsaturated monomer aqueous solution may have a suitable pH value, and may not cause damage once contacting with human body carelessly. It is noted that the neutralizing concentration herein is defined as a ratio of mole number of the alkaline solution to mole number of the unsaturated monomer aqueous solution, or it may also defined as percentage of acid group being neutralized in the unsaturated monomer aqueous solution. In some embodiments, the pH value of the unsaturated monomer aqueous solution is 5.5 to 7.0, and 5.5 to 6.5 is preferable. If the pH value of the unsaturated monomer aqueous solution is within 5.5 to 7.0, it will be hard to remain great amount of unreacted monomer in the solution after polymerization, and the produced superabsorbent polymers may have better physical properties and greater absorption capacity.

Pre-polymerization reaction begins with decomposition of the polymerization initiator to generate free radicals. In some embodiments, based on an amount of the unsaturated monomer aqueous solution as 100 wt %, a suitable amount of the polymerization initiator is 0.001 wt % to 10 wt %, and 0.1 wt % to 5 wt % is preferable. If the amount of the polymerization initiator is within the aforementioned range, a reacting rate of the free radical polymerization reaction is suitable, economic efficiency of the reaction is better, and it may avoid forming solid gel due to excessive polymerization.

In some embodiments, the polymerization initiator includes a thermal decomposition initiator, a redox initiator or a combination thereof. In some embodiments, the thermal decomposition initiator comprises peroxide compounds (for example, hydrogen peroxide, di-t-butyl peroxide, peroxyamide or persulfate (including ammonium salt and alkali metal salt)) and azo compounds (for example, 2,2'-azobis (2-amidinopropane) dihydrochloride salt or 2,2'-azobis (N,N-dimethylene isobutylamidine) dihydrochloride salt). In some embodiments, the redox initiators comprise bisulfite salt, ascorbic acid or ferrous salt. The polymerization initiators are better used by combining the thermal decomposition initiators and the redox initiators, in which the redox initiators generate free radicals, and when the free radicals transfer to the monomers, the polymerization reaction is induced, and thus great heat energy released from the polymerization reaction increases temperature. When it reaches specific temperature, the thermal decomposition initiators are further decomposed, and the polymerization reaction is more completed, thus avoiding remaining excess unreacted monomers.

The free radical polymerization crosslinking agent in the superabsorbent polymer composition makes the superabsorbent polymer composition have suitable degree of crosslinking, and increase processability of the superabsorbent polymer composition after the polymerization. In some embodiments, the free radical polymerization crosslinking agent may select compounds including two or more unsaturated double bonds, such as N,N-bis(2-propenyl)amine, N,N-methylene bisacrylamide, N,N-methylene bismethacrylamide, propylene acrylate, ethylene glycol diacrylate, poly(ethylene glycol) diacrylate, ethylene glycol dimethacrylate, polyethylene glycol dimethyl acrylate, glycerol triacrylate, glycerol trimethacrylate, glycerol added ethylene oxide triacrylate or trimethacrylate, trimethylolpropane trimethacrylate, trimethylolpropane triacrylate, N,N,N-tris (2-propenyl)amine, diacrylic acid ethylene glycol ester, polyoxyethylene triacrylate glycerol ester, diethylene polyoxyethylene glycerol triacrylate, dipropylene triethylene glycol ester, and may select compounds having two or more epoxy groups, such as sorbitol polyglycidyl ether, polyglycerol polyglycidyl ether, ethylene glycol diglycidyl ether, diethylene glycol diglycidyl ether, polyethylene glycol diglycidyl ether, diglycerol polyglycidyl ether, and etc. In some embodiments, based on the amount of the unsaturated monomer aqueous solution as 100 wt %, an amount of the free radical polymerization crosslinking agent is 0.001 wt % to 5 wt %, and 0.01 wt % to 3 wt % is preferable. If the amount of the free radical polymerization crosslinking agent is within the aforementioned range, viscosity of the polymer solution after reaction is suitable, thus easier to be processed. Therefore, the absorption capacity of the superabsorbent polymer produced is greater.

In some embodiments, the above free radical polymerization reaction may be performed in a batch reaction vessel or a conveyor reactor.

In some embodiments, the colloid gel is cut to have a diameter not greater than 20 mm by using a crusher, and it is preferable to have the diameter not greater than 10 mm, and then a screening step is performed. In some embodiments, the screening step filters the colloid gel with the diameter smaller than 2.0 mm initially, and 0.05 mm to 1.50 mm is preferable. The colloid gel with the diameter greater than 2.0 mm should be returned to the reactor and cut again. The diameter should be controlled in the aforementioned range in order to avoid generating more fine powders in back-end process. Generally, while the particle size distribution of the superabsorbent polymers is narrower, the physical properties of the superabsorbent polymers are better.

In some embodiments, before performing the following operation, drying process of the colloid gel is selectively performed. In some embodiments, the drying process is performed at temperature of 100° C. to 250° C. The drying process performed in the aforementioned temperature range may effectively control drying time, and may effectively control degree of crosslinking to avoid remaining great amount of unreacted monomers.

Subsequently, operation 120 is performed to smash and screen the colloid gel to obtain plural of superabsorbent polymer particles. In some embodiments, a particle size of the superabsorbent polymer particles is screened to a range of 0.06 mm to 1.00 mm, and 0.10 mm to 0.85 mm is preferable. When the particle size of the superabsorbent polymer particles is controlled within the aforementioned range, an amount of fine particles of the product may be decreased, and the absorptivity of the superabsorbent polymer may be better.

Then, operation 130 is performed to perform a surface crosslinking reaction to the superabsorbent polymer particles to obtain the superabsorbent polymer. The superabsorbent polymer is an insolvable hydrophilic polymer, whose interior has a uniform bridge structure. Typically, a bridging is further performed at a surface of the superabsorbent polymer to increase the absorption rate, a colloid strength, an anti-blocking property, the permeability for the liquid, and etc. The surface crosslinking reaction is performed with a surface crosslinking agent having functional groups, which can react with acid groups. In some embodiments, the surface crosslinking agent includes polyol, polyamine, a compound having at least two epoxy groups and alkylene carbonate. For example, the polyol may be glycerol, ethylene glycol, diethylene glycol, triethylene glycol, polyethylene glycol, propylene glycol; the polyamine may be ethylenediamine, diethylenediamine and triethylenediamine; the compound having at least two epoxy groups may be sorbitol polyglycidyl ether, polyglycerol polyglycidyl ether, ethylene glycol diglycidyl ether, diethylene glycol diglycidyl ether, diethylene glycol diglycidyl ether and diglycerol polyglycidyl ether; and the alkylene carbonate may be ethylene glycol carbonate, 4-methyl-1,3-dioxolan-2-one, 4,5-dimethyl-1,3-dioxolan-2-one, 4,4-dimethyl- 1,3-dioxolan-2-one, 4-ethyl-1,3-dioxolan-2-one, 1,3-dioxan-2-one, 4,6-dimethyl-1,3-dioxan-2-one and 1,3-dioxepan-2-one. The surface crosslinking agents may be used individually or combined two or more to perform reaction. In addition, according to the chosen surface crosslinking agent, it may be added directly, or it may be prepared as an aqueous solution or a hydrophilic organic solution first and then added. The hydrophilic organic solvent includes, but not limit to methanol, ethanol, propanol, isobutanol, acetone, methyl ether, ethyl ether, and etc.

In some embodiments, based on the amount of the superabsorbent polymer particles as 100 wt %, adding amount of the surface crosslinking agent is 0.001 wt % to 10 wt %, and 0.005 wt % to 5 wt % is preferable. When the adding amount of the surface crosslinking agent is within the aforementioned range, the superabsorbent polymer may have a bridge structure at its surface, and the absorptivity is further improved.

Figure 2A:
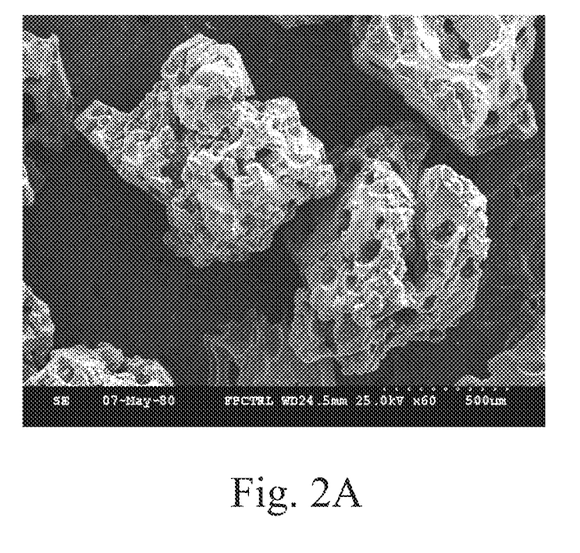
FIG. 2A and FIG. 2B are scanning electron microscopic images of the superabsorbent polymers with and without adding the calcined shell powders, respectively.
Figure 2B:
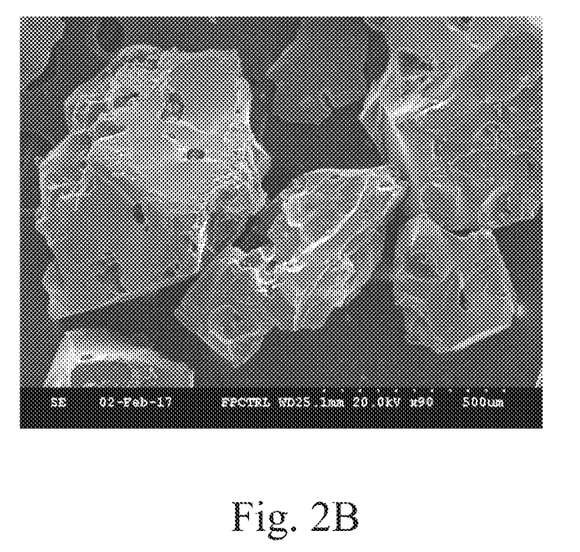

The superabsorbent polymer produced by the method 100 of producing superabsorbent polymer may have more micropores. Referring to FIG. 2A and FIG. 2B, FIG. 2A is a scanning electron microscopic image of the superabsorbent polymer produced by the method 100, while FIG. 2B is a scanning electron microscopic image of the superabsorbent polymer produced without adding the calcined shell powders. As shown in FIG. 2A and FIG. 2B, the present invention produces the superabsorbent polymer with plenty of micropores by adding the calcined shell powders to be involved in the free radical polymerization reaction. Therefore, the absorptivity of the superabsorbent polymer is improved.

As described above, the superabsorbent polymer produced by the method 100 may have better absorption rate, which can evaluate by free swell rate (FSR). The free swell rate of the superabsorbent polymer of the present invention is not less than 0.25 g/g/s, and not less than 0.27 g/g/s is preferable. It is noted that the superabsorbent polymer with higher free swell rate may absorb liquid rapidly in a condition without applying pressure.

Moreover, the produced superabsorbent polymer also has better permeability for the liquid; hence the problems of absorber rewet, bad dryness and leakage may be decreased. The permeability for the liquid can be evaluated by saline flow conductivity (SFC), which indicates permeability for the liquid of the superabsorbent polymer after absorbing the liquid and having high pressure, when the liquid keeps entering the absorber, it is prone to pass the superabsorbent polymer with liquid absorbed, and diffuses into another superabsorbent polymer without liquid absorbed. The saline flow conductivity of the superabsorbent polymer of the present invention is not less than $30 \times 10^{-7}$ cm$^3$·s/g, and not less than $40 \times 10^{-7}$ cm$^3$·s/g is preferable.

In addition, an ability of absorbing liquid of the dry superabsorbent polymer once contacting with the liquid may be evaluated by T20 value. When the superabsorbent polymer has a lower T20 value, it means that the dry superabsorbent polymer can easily absorb liquid. T20 value of the superabsorbent polymer of the present invention is not greater than 180 seconds, and not greater than 160 seconds is preferable. It is noted that T20 value is defined as how much time does 1 g superabsorbent polymer require for absorbing 20 g normal saline and 0.01 wt % alcohol ethoxylate compound solution under a pressure of 0.3 psi, in which the alcohol ethoxylate compound has 12 to 14 carbon atoms. The superabsorbent polymer of the present invention has both lower T20 value and greater saline liquid conductivity, thus decreasing rewet capacity of the absorber and increasing dryness of the diapers.

The aforementioned absorber is the absorber by using the superabsorbent polymer of the present invention and hydrophilic fiber shaped into lamellar, which fix the superabsorbent polymer on pulp fiber material and/or non-woven fabric. The pulp fiber may be pulverized wood-pulp, crosslinked fiber fabric, cotton, wool, vinyl acetate fiber, and etc. Generally, an amount of the superabsorbent polymer in the absorber is 20 wt % to less than 100 wt %, 40 wt % to less than 100 wt % is preferable, and 50 wt % to less than 100 wt % is more preferable. When the absorber uses such high amount of superabsorbent polymer, it shows benefits of the present invention more significantly.

In practical application, the above absorber may be disposed on polyethylene film without permeability for the liquid, and then non-woven fabric with permeability for the liquid is used as a surface layer. In general, basis weight (weight per unit area) of the above absorber is 0.01 g/cm$^2$ to 0.30 g/cm$^2$, and thickness is 30 mm or less.

The following embodiments are provided to better elucidate the practice of the present invention and should not be interpreted in anyway as to limit the scope of same. Those skilled in the art will recognize that various modifications may be made while not departing from the spirit and scope of the invention. All publication and patent applications mentioned in the specification are indicative of the level of those skilled in the art to which this invention pertains.

Prepare Calcined Shell Powders

Preparation Example 1

Leftover shell meat of the abandoned oyster shells (Source: Wanggong in Changhua County) is removed. After cleaning the surface of the oyster shells, they are coarse broken into oyster shell granules by using the commercial pulverizer and then filtered by 40 mesh sieve. Then, after using calcium hydroxide slurry (aqueous suspension, 500 mL) with concentration of 2.5 wt % to cover the oyster shell granules (60 g) for 2 hours, the oyster shell granules is calcined at 1000° C. for 4 hours to obtain the calcined shell powders (1) with the core-shell structure and an average particle size of 415 μm.

Preparation Example 2 and 3

Preparation example 2 and 3 are produced by using similar processing steps of preparation example 1. The difference is that the concentration of calcium hydroxide is changed to 10 wt % in preparation example 2, and the produced calcined shell powders (2) had an average particle size of 450 μm. Preparation example 3 used 140 mesh sieve to filter the oyster shell granules, and the produced calcined shell powders (3) had an average particle size of 95 μm.

Production of Superabsorbent Polymers

Embodiment 1

503.12 g of sodium hydroxide solution with a concentration of 48 wt % was slowly added into a 2000 c.c. Erlenmeyer flask with 621.03 g of acrylic acid and 670.74 g of water for 2 hours, in which adding ratio of sodium hydroxide/acrylic acid is within a range of 0.85 to 0.95, and a temperature of neutral reaction system in the flask was kept within 15° C. to 40° C., thus obtaining an unsaturated monomer aqueous solution with monomer concentration of 42 wt %, in which 70 mol % acrylic acid is partially neutralized to sodium acrylate, and a pH value is 5.69.

Subsequently, 1.36 g of N,N'-methylene bisacrylamide (free radical polymerization reaction crosslinking agent) was added into the unsaturated monomer aqueous solution with maintaining the temperature at about 20° C., and 17.91 g of the calcined shell powders (1) was then added into the solution. Afterwards, 0.35 g of hydrogen peroxide, 4.15 g of sodium bisulfite and 4.15 g of ammonium persulfate were added as polymerization initiator to perform the free radical polymerization reaction.

Produced colloid gel was smashed by a cutting pulverizer and was filtered to obtain the colloid gel with particle size of 2 mm and less. Subsequently, a drying process is performed at the temperature of 130° C. for 2 hours, and a sieve with diameter of 0.1 mm to 0.85 mm was used to filter, thus obtaining superabsorbent polymer particles.

Then, 200 g of the superabsorbent polymer was weighed and 2.5 g of a mixing solution of ethylene glycol, aluminum sulfate and water with volume ratio of 1:0.5:2 was added as the surface crosslinking agent. The thermal treatment is performed at a temperature of 160° C. for 1 hour, and thus the superabsorbent polymer is obtained after cooling.

Embodiments 2 to 5

The superabsorbent polymers of embodiments 2 to 5 were produced by using the similar processing step as embodiment 1. The difference is that the amount of the calcined shell powders (1) of embodiment 2 is 44.87 g; adding amount of the surface crosslinking agent (i.e. the mixing solution of ethylene glycol, aluminum sulfate and water) of embodiment 3 increased to 5.0 g; embodiment 4 used 4.63 g of polyethylene glycol 600 diacrylate (UM82-080, which was produced by EVERMORE CHEMICAL INDUSTRY CO, LTD.) to replace N,N'-methylene bisacrylamide as the free radical polymerization crosslinking agent; and embodiment 5 used the calcined shell powders (2) to replace the calcined shell powders (1).

Comparative Examples 1 to 5

The superabsorbent polymers of comparative examples 1 to 5 were also produced by using the similar processing step as embodiment 1. The difference is that comparative example 1 used sodium carbonate (product name: FP-100A produced by Formosa Plastic Co, LTD.) to replace the calcined shell powders (1); comparative example 2 used a resin encapsulated blowing agent to replace the calcined shell powders (1), in which the resin encapsulated blowing agent was produced by a method of producing a resin encapsulated blowing agent described in U.S. Pat. No. 7,163,966; comparable example 3 did not add the calcined shell powders (1); comparable example 4 added the calcined shell powders (1) after smashing the colloid gel; and comparable example 5 used the calcined shell powders (3) to replace the calcined shell powders (1).

Evaluation Method

In order to evaluate properties of the superabsorbent polymers of the present invention, the following test methods were used to analyze their physical properties. The evaluation is performed at room temperature (23±2° C.) and relative air humidity of 45±10% unless otherwise specified. The superabsorbent polymers should be completely mixed before analyzing.

Centrifuge Retention Capacity

Centrifuge Retention Capacity (CRC) was measured in accordance with WSP 241.2 (12) test method regulated by European Disposables and Nonwovens Association (EDANA). The Centrifuge Retention Capacity test results of the superabsorbent polymer particles and the superabsorbent polymers are shown in table 1, respectively.

Absorption Against Pressure

Absorption against pressure (AAP) was measured in accordance with ERT 442.3(10) test method regulated by EDANA. The absorption against pressure of the superabsorbent polymers for 0.9% of sodium chloride solution was tested under pressure of 4.9 kPa for 60 minutes. The test results of the superabsorbent polymers are shown in table 1.

Saline Flow Conductivity

Saline flow conductivity (SFC, unit: $10^{-7}$ $cm^3$-sec/g) was measured and calculated according to a method described in U.S. Pat. No. 5,562,646. The superabsorbent polymers were placed into Jayco synthetic urine for 60 minutes, and the flow conductivity of a 0.118M sodium chloride solution was measured under a confining pressure of 0.3 psi. The saline flow conductivities of the superabsorbent polymers are shown in table 1.

T20 Value

T20 value (unit: seconds) was measured and calculated according to a method described in U.S. Pat. No. 9,285,302. T20 value is defined as time of 1 g superabsorbent polymer required to absorb 20 g normal saline and 0.01 wt % alcohol ethoxylate compound solution, in which the alcohol ethoxylate compound has 12 to 14 carbon atoms. Average values of 3 repeated test results are shown in table 1.

Free Swell Rate

Free swell rate (FSR, unit: g/g/s) was measured and calculated according to a method described in U.S. Pat. No. 10,028,867. 4 g of the superabsorbent polymer was dried at temperature of 23±2° C. and under a pressure lower than 0.01 torr for 48 hours, and then about 1 g of the superabsorbent polymer was placed into a beaker and dispersed at bottom of the beaker. Subsequently, 20 g of sodium chloride solution with concentration of 0.9 wt % was poured in. Time required from the liquid once contacted with the superabsorbent polymers to be fully absorbed by the superabsorbent polymer was measured. The free swell rate was amount of the liquid divided by weight of the superabsorbent polymers, and divided by the time required. Average values of 3 repeated test results are shown in table 1.

TABLE 1

|  | Embodiment | | | | | Comparative example | | | | |
| --- | --- | --- | --- | --- | --- | --- | --- | --- | --- | --- |
|  | 1 | 2 | 3 | 4 | 5 | 1 | 2 | 3 | 4 | 5 |
| CRC(g/g) | 30 | 30 | 30 | 30 | 30 | 31 | 30 | 30 | 30 | 31 |
| AAP (g/g) | 26 | 25 | 25 | 25 | 26 | 25 | 25 | 25 | 23 | 23 |
| SFC($10^{-7}$ $cm^3$-sec/g) | 51 | 71 | 86 | 56 | 61 | 20 | 23 | 19 | 18 | 19 |

TABLE 1-continued

|  | Embodiment | | | | | Comparative example | | | | |
|---|---|---|---|---|---|---|---|---|---|---|
|  | 1 | 2 | 3 | 4 | 5 | 1 | 2 | 3 | 4 | 5 |
| T20 value(sec) | 161 | 142 | 157 | 158 | 147 | 183 | 174 | 211 | 201 | 211 |
| FSR(g/g/s) | 0.3 | 0.3 | 0.3 | 0.3 | 0.3 | 0.3 | 0.3 | 0.2 | 0.2 | 0.2 |

Preparation of Absorbers

An absorber-forming machine was used to mix and mold 10.0 g of the superabsorbent polymers and 10.0 g of pulverized wood pulp, in which a molding mesh was a metal net with 400 mesh (38 μm), and an area of the absorber was 160 cm$^2$ (8 cm×20 cm). The molded absorber was placed on top of polyethylene film, and nonwoven fabric was then placed on the molded absorber. Next, a pressure of 18.39 kPa (area of 160 cm$^2$, weight of 30 Kg) was applied to the nonwoven fabric. After the pressure was applied for 5 minutes, the molded absorber was adhered around with white glue for obtaining the absorber for test.

Embodiments 6 to 10 and Comparative Examples 6 to 10

Embodiments 6 to 10 are absorbers prepared by the above method with the superabsorbent polymers of embodiments 1 to 5, respectively; while comparative examples 6 to 10 are absorbers also prepared by the above method with the superabsorbent polymers of comparative examples 1 to 5. Basis weight and thickness of the absorbers are shown in table 2.

Rewet Property of the Absorber

When the rewet amount of the absorber is lower, it means that urine tolerance of the superabsorbent polymer is better. Test method is that 4.8 kPa (area of 160 cm$^2$, and a weight of 7.8 Kg) of a weight was placed on the absorbers of embodiments 6 to 10 and comparative examples 6 to 10. Then, 180 mL of synthetic urine (the Jayco synthetic urine described in U.S. Patent Publication No. 20040106745) was added to a center point of the absorber for three times (every 30 minutes), and after the synthetic urine was completely added, the weight on the absorber was removed after 30 minutes. Then, 30 pieces of filter papers (8 cm×20 cm), which has total weight of W1, were weighed in advance and put on the absorber, and 4.8 kPa of the weight was immediately put on the absorber for 5 minutes, so that the aforementioned filter papers absorbed liquid rewet from the absorber. Afterwards, the 30 pieces of the filter papers were weighed as W2. The rewet amount of the synthetic urine rewet from the absorber was (W2−W1). Test results are shown in table 2.

TABLE 2

|  | Embodiment | | | | | Comparative example | | | | |
|---|---|---|---|---|---|---|---|---|---|---|
|  | 6 | 7 | 8 | 9 | 10 | 6 | 7 | 8 | 9 | 10 |
| basis weight (g/cm$^2$) | 0.07 | 0.08 | 0.08 | 0.07 | 0.07 | 0.07 | 0.08 | 0.07 | 0.08 | 0.07 |
| thickness (mm) | 15 | 16 | 17 | 16 | 16 | 16 | 17 | 16 | 16 | 16 |
| rewet amount (g) | 2.9 | 2.6 | 2.2 | 2.3 | 1.9 | 6.4 | 7.3 | 10.5 | 8.4 | 9.2 |

According to the above test results, compared to comparative examples 1 to 5, all of embodiments 1 to 5 had greater saline flow conductivity and free swell rate, and had lower T20 value. In other words, the superabsorbent polymers of embodiments 1 to 5 could relatively easy to absorb liquids in dry condition, and liquid diffusibility and conductivity are also better. Moreover, the absorbers prepared with superabsorbent polymers of embodiments 1 to 5 had less liquid rewet amount, so as to increase dryness.

Therefore, application of the method of producing the superabsorbent polymer of the present invention, which adds specific amount of the calcined shell powders with specific particle size to involve in the free radical polymerization reaction. Then, the superabsorbent polymers with more micropores are obtained, and the absorptivity and permeability for the liquid of the superabsorbent polymers are further increased. Moreover, diffusibility and conductivity of the superabsorbent polymers in the dry condition are also improved.

Although the present invention has been described in considerable detail with reference to certain embodiments thereof, other embodiments are possible. Therefore, the spirit and scope of the appended claims should not be limited to the description of the embodiments contained herein.

What is claimed is:

1. A method of producing superabsorbent polymer, comprising:
    performing a free radical polymerization reaction to a superabsorbent polymer composition and calcined shell powders to obtain a colloid gel, wherein the superabsorbent polymer composition includes an unsaturated monomer aqueous solution, a polymerization initiator, and a free radical polymerization crosslinking agent, the calcined shell powders comprise calcium carbonate, the calcined shell powders have a core-shell structure, the calcined shell powders have a particle size of 100 μm to 1 mm, and based on an amount of the unsaturated monomer aqueous solution as 100 wt %, the amount of the calcined shell powders is 0.005 wt % to 10 wt %;
    smashing and screening the colloid gel to obtain a plurality of superabsorbent polymer particles; and
    performing a surface crosslinking reaction to the superabsorbent polymer particles to obtain the superabsorbent polymer.

2. The method of claim 1, wherein a core of the core-shell structure is a micron particle of calcium carbonate, a shell layer of the core-shell structure is nanometer to sub-micron particles of calcium carbonate, an average particle size of the core is 7 μm to 500 μm, and an average particles size of the shell layer is not greater than 200 nm.

3. The method of claim 1, wherein whiteness of the calcined shell powders is at least 60.

4. The method of claim 1, wherein the specific surface area of the calcined shell powders is at least 8000 cm$^2$/g.

5. The method of claim 1, wherein the calcined shell powders are added before, during or after the free radical polymerization reaction is performed.

6. The method of claim 1, wherein pH value of the unsaturated monomer aqueous solution is 5.5 to 7.0.

7. The method of claim 1, wherein the polymerization initiator comprises a thermal decomposition initiator, a redox initiator or a combination thereof.

8. The method of claim 1, wherein based on the amount of the unsaturated monomer aqueous solution as 100 wt %, the amount of the polymerization initiator is 0.001 wt % to 10 wt %.

9. The method of claim 1, wherein based on the amount of the unsaturated monomer aqueous solution as 100 wt %, the amount of the free radical polymerization crosslinking agent is 0.001 wt % to 5 wt %.

10. The method of claim 1, further comprising:
   drying the colloid gel at a temperature of 100° C. to 250° C. before smashing and screening the colloid gel.

11. The method of claim 1, wherein the average particle size of the superabsorbent polymer particles is 0.06 mm to 1.00 mm.

12. The method of claim 1, wherein based on the amount of the superabsorbent polymer particles as 100 wt %, the amount of the surface crosslinking agent is 0.001 wt % to 10 wt %.

* * * * *